(No Model.)
W. M. ECCLES.
CORN PLANTER.
No. 290,552. Patented Dec. 18, 1883.
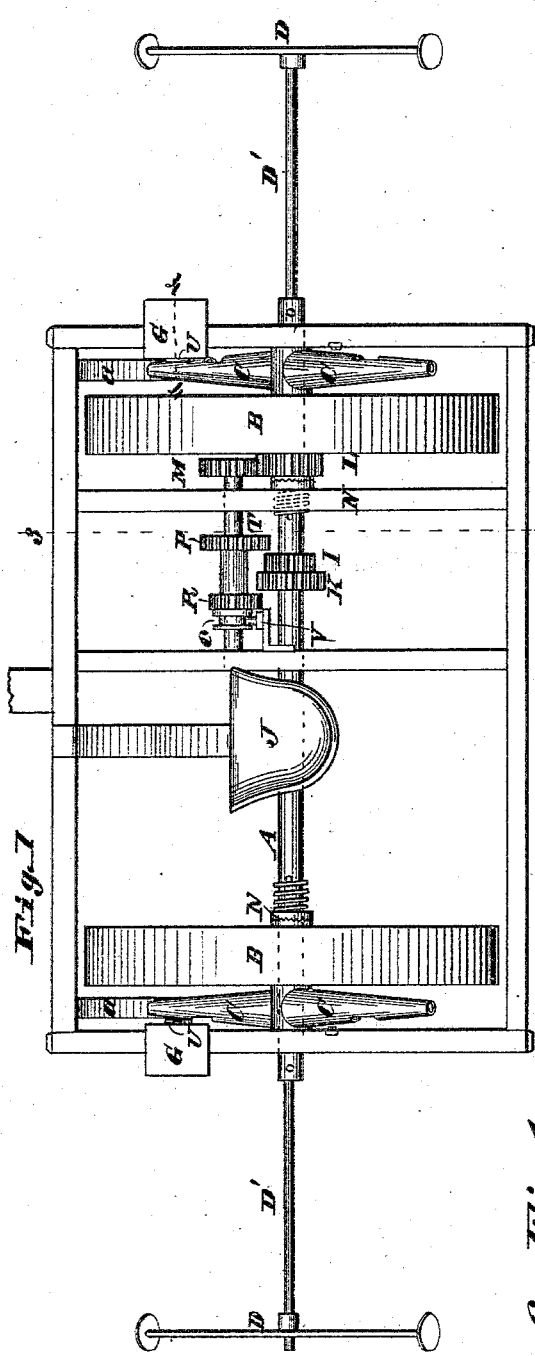
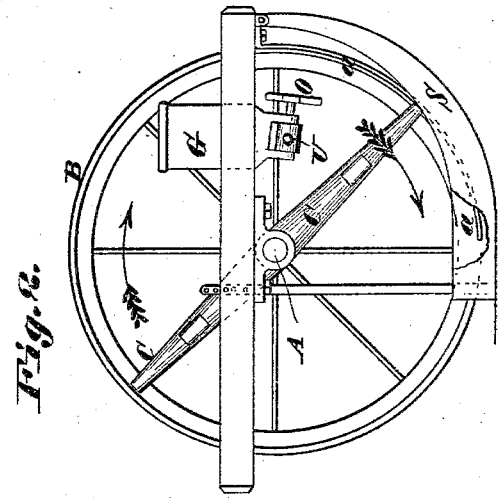
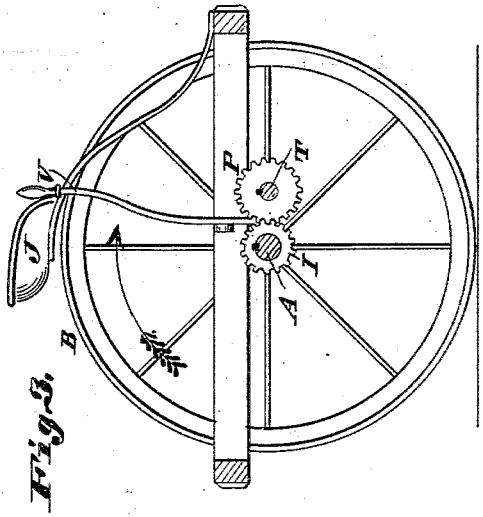
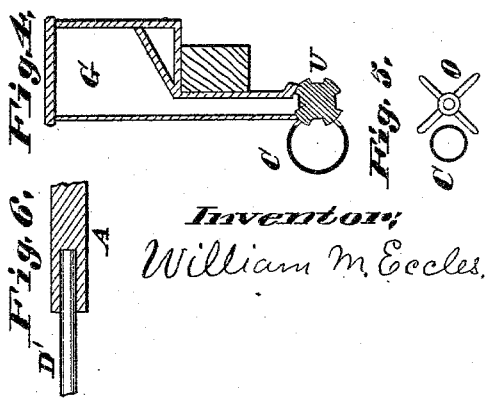
Attest:
Charles Pickles
Jno. A. McGrable
Inventor,
William M. Eccles.

UNITED STATES PATENT OFFICE.

WILLIAM M. ECCLES, OF ST. LOUIS, MISSOURI.

CORN-PLANTER.

SPECIFICATION forming part of Letters Patent No. 290,552, dated December 18, 1883.

Application filed November 1, 1883. (No model.)

*To all whom it may concern:*

Be it known that I, WILLIAM M. ECCLES, a citizen of the United States of America, residing in St. Louis, State of Missouri, have invented a new and useful Improvement in Corn-Planters; and I do hereby declare the following to be a full and exact description of the same, reference being had to the annexed drawings and letters of reference marked thereon.

The object of my invention is to construct a corn-planter which will plant check-rows by means of traction-wheels and a movable shaft operating thereon, and which can be operated and the result achieved by the driver without the aid of a second man, or without the aid of cords or cables, and which can be done while the machine is in motion.

The invention consists, mainly, in providing the shaft which regulates and produces the dropping with gear-wheels, by which it can be connected in its motion with the motion of the traction-wheels of the planter while the machine is in motion, and in so arranging said gear-wheels between said shaft and traction-wheels that said shaft can be retarded or accelerated in its motion with the motion of the traction-wheels at the pleasure of the driver, without stopping the machine, so that when the droppers are gaining on the rows on account of unevenness of ground or slipping of the traction-wheels, or any other cause, the shaft can be caused to accelerate in its motion and gain on the motion or revolution of the traction-wheels sufficiently to bring the droppers back in line with the rows being dropped, by throwing the gear-wheels in gear, and when the droppers are brought back in line again the gear-wheels are thrown out of gear and the droppers follow the space traversed by the traction-wheels, and when the droppers are falling behind the line of the rows the shaft can be caused to retard its motion, and thus allow the motion of the traction-wheel to gain in its revolution on the motion or revolution of the shaft, and thus bring the droppers up in line of the row as before, when the gear-wheels may be thrown out of gear, and the droppers will be operated by the shaft moving with the same motion as the traction-wheels, and the distance between the rows will be measured by the traction-wheels, and as soon as the droppers begin to vary from the line of the row they can be brought back again by the use of the gear-wheels while the machine is in motion, and without stopping the same.

To enable others skilled in the art to make my machine, I will proceed to explain the same.

Figure 1 in the drawings shows a top view of my invention. Fig. 2 shows an elevation view of the corn-planter from the side. Fig. 3 shows a transverse sectional view on the line 3 3 in Fig. 1. Fig. 4 shows a sectional view of the grain-box, arm, and dropper, drawn through the line 4 4 in Fig. 1. Fig. 5 shows a section of the arm C and armlets o. Fig. 6 is a center longitudinal sectional view of the shafts A and D at their points of intersection with each other.

Letter A in the drawings is a shaft passing through the centers of the wheels B B, and turning in bearings in the frame-work of the planter, and upon which shaft the wheels B B are made to move when the gear-wheels are in gear, but which turn with said shaft when the gear-wheels are thrown out of gear.

N N are friction-clutches held against corresponding clutches or notches on the insides of the hubs of the wheels B B by spiral springs, and serve to prevent the wheels B B from turning on the shaft A when the gear-wheels are not in gear, and to carry the shaft A in the same motion as the wheels B B. These friction-clutches will give and allow the shaft A to turn in the wheels B B when the gear-wheels are in gear, the clutch part being angular, so as to slip when sufficient pressure is put upon it.

C C are arms made hollow a part or all of the way from the shaft A to the end of the arms, and are provided with openings near their respective ends, which receive the corn from the cylinder-gage U, and through which it passes into the arm, which conveys it into the earth. These arms are connected with the shaft A at either end, and are in the same plane, and are carried around with said shaft. These arms serve to carry the grain into the ground at regular intervals, and in this sense are the droppers of the machine. These arms are provided with a shield, *a*, which is a piece of steel or metal, and is attached to the framework of the planter, and, following in the periphery of the circle described by the arm C in its revolution, serves to cover the opening at the end of the arm C, and prevents the corn from coming out until the arm reaches the end of the shield, when the grain will drop out of the arm into the earth behind the shoe S.

D D are arms attached to the shafts D' D', which shafts are screwed into the shaft A, and said arms are provided at their respective ends with heads which will make marks or indentations in the ground to mark the line of the row. These arms D D move with the shaft A, and are in the same plane as the arms C C C C, and consequently mark in the same line crosswise in which the hills are planted by the arms C C C C.

G is an ordinary grain-box, and U is an ordinary cylinder-gage dropper, with gage-holes in its periphery to carry the grains, and is provided with journals, to which are attached the armlets o, by means of which it is revolved a quarter of a revolution every time the arm C passes it. The number of armlets o corresponds to the number of holes in the cylinder-gage U, and are arranged so that as the arm C passes around it strikes one of the armlets o and moves the cylinder-gage one-quarter of a revolution, and until the contents of one hole are emptied into the aperture of the arm C. The grain then runs down the arm until stopped by the shield, when it is carried around by the arm C until it reaches the end of the shield a, when it escapes into the earth behind or in the shoe S, and when the next arm comes around the operation is repeated. Thus the dropping is regulated by the movement of the arms C C C C, which, in turn, are regulated by the gear-wheels connecting the motion of the shaft A with the motion of the traction-wheels B B.

J is the seat for the driver, and is situated in a line with the shaft A and its arms C C C C and markers D D, so as to enable the driver to more readily observe whether the arms are keeping in line with the cross-rows or not, and, if not, to put them in line by throwing the gear-wheels in gear while the machine is in motion.

V is a lever having a clutch, c, working in a groove in the axle of the gear-wheels R and P, and by means of which said wheels are moved from the right to the left on the shaft T, on which they slide, but do not turn, and thrown in gear with the wheels K and I on the shaft A. The wheels K and I are fastened permanently on the shaft A, and the wheel I is smaller than the wheel K or its mate P. The wheel L is fastened permanently on the hub of or to the wheel B, and meshes in the wheel M of the same size, which wheel M is fastened permanently on the shaft T. Now, when the machine is set in motion, the shaft A, being held by the friction-clutches N N to the wheels B B, is caused to revolve with said wheels, and partakes of the same motion as said wheels, and the arms C C C C will revolve around and drop their contents of grain at regular intervals, unless prevented by unevenness of ground or slipping of the wheels, which, of course, is sure to occur, in which case the arms C C will gain or lose on the line of the cross-rows being planted, and will not be opposite the hills already planted. When this occurs, it can be readily detected by the driver, for the tread of the markers D D will not meet the marks made on the last round nor be in line with the same. If the markers are overreaching the line of the row and the hills are being deposited ahead of the rows, the driver pulls the lever V to the left and brings the wheel P in gear with the smaller wheel on the shaft A, (designated by the letter I,) which will accelerate the motion of the shaft A with the motion of the wheels B B, and thus soon bring the arms back in a line with the cross-rows. If, on the other hand, at any time, the driver discovers that the hills are being deposited behind the rows, he has but to move the lever V to the right and throw the gear-wheel R in gear with the larger wheel K on the shaft A, which will cause the shaft A to retard in its motion with the motion of the wheels B B, which will gradually bring the arms back in line with the row again. It will be observed that this can be done while the machine is in motion. When the arms are set right by these gear-wheels, the gear-wheels can be thrown out of gear while the machine is in motion, thus enabling the driver to keep the arms dropping the grain revolving, so as to deposit the hills in straight lines and rows each way with perfect ease and without stopping his machine.

Of course I can slip the left-hand wheel B on the shaft A, as well as the arms C C, and thus make the rows narrower or wider, as I may desire. I can also attach more arms to the shaft A, and thus convert my planter into a corn-drill, if desired. Of course the shoe S is old, and the cylinder-gage U is old; but

What I claim as new, and for which I ask Letters Patent to be granted to me, is—

1. In a corn-planter, the wheels L, M, P, R, and I, arranged substantially as described, and adapted to accelerate or retard the shaft A in its motion with the motion of the traction wheel or wheels B B while the machine is in motion.

2. In a corn-planter, the wheels R, propelled by the traction-wheels B, and adapted to be thrown in gear with the larger wheel K while the machine is in motion, in combination with said wheel K, operating to retard the motion of the shaft A, for the purposes specified.

3. In a corn-planter, the gear-wheel P, propelled by the traction-wheel B, and adapted to be thrown in gear with the smaller wheel I while the machine is in motion, in combination with the smaller wheel I, and operating to accelerate the motion of the shaft A on the motion of the traction wheel or wheels B B, for the purposes specified.

4. In a corn-planter, the traction wheel or wheels B B, with their wheels L, M, P, and R, in combination with the shaft A, having the wheels K and I, substantially as described, and for the purposes set forth.

5. In a corn-planter, the shaft T, with its gear-wheels R and P and lever V, in combination with the shaft A and wheels K and I, substantially as above described, and for the purpose of accelerating or retarding the motion of the shaft A with the revolution of the traction-wheel B while the machine is in motion.

6. In a corn-planter, the combination of the gear-wheels, substantially as described, the friction clutch or clutches N N, and the shaft A, all arranged and operating to carry the shaft A around in the same motion with the motion of the traction-wheels when the gear-wheels are not in gear, and to accelerate or retard the motion of the shaft A with the motion of the traction wheel or wheels when the gear-wheels are in gear, for the purposes set forth.

7. In a corn-planter, the gear-wheels, as described, in combination with the shaft A, arms C C, markers D D, friction-clutches N N, and shoe S, all substantially arranged as described, and for the purposes set forth.

8. In a corn-planter, the gear-wheels, substantially as described, in combination with the shaft A, arms C C, and friction-clutches N N, substantially as described, and for the purposes set forth.

9. In a corn-planter, the cylinder-gage U, with its armlets o, in combination with the arms C C, substantially as above described, and for the purposes set forth.

10. In a corn-planter, the arms C C C C, arranged on the shaft A, and moving with it and conveying the corn from the corn-box into the ground, in combination with the gear-wheels L, M, P, R, K, and I, as above described, and for the purposes set forth.

WILLIAM M. ECCLES.

Attest:
  A. A. PAXSON,
  FRED. YOUNG.